United States Patent [19] [11] 3,914,542
Boltz, Jr. [45] Oct. 21, 1975

[54] TIMING SIGNALS FOR VELOCITY ERROR CORRECTION

[75] Inventor: Charles D. Boltz, Jr., Greenwood, Ind.

[73] Assignee: RCA Corporation, New York, N.Y.

[22] Filed: Oct. 1, 1973

[21] Appl. No.: 402,081

[30] Foreign Application Priority Data

Mar. 20, 1973 United Kingdom .............. 13263/73

[52] U.S. Cl. ......... 178/6.6 A; 179/100.4 E; 360/73; 178/6.6 DD

[51] Int. Cl. ........................................... G11b 17/00

[58] Field of Search ........................ 179/100.4 D, 100.4 E, 100.3 V; 178/6.7 A, 6.6 A, 6.6 DD; 360/70, 73

[56] References Cited

UNITED STATES PATENTS

| | | | |
|---|---|---|---|
| 3,345,457 | 10/1967 | MacLeod | 360/70 |
| 3,535,441 | 10/1970 | Grace | 360/70 |
| 3,711,641 | 1/1973 | Palmer | 178/6.6 DD |
| 3,742,134 | 6/1973 | Uemura | 178/6.6 DD |
| 3,829,612 | 8/1974 | Beyers | 179/100.4 E |

*Primary Examiner*—Bernard Konick
*Assistant Examiner*—Alan Faber
*Attorney, Agent, or Firm*—Eugene M. Whitacre; Stephen Siegel; William H. Meagher

[57] ABSTRACT

Circuit means are provided for reducing the noise signals amongst regularly recurring horizontal synchronization timing signals extracted from composite video signals recorded on a video disc and for blanking these timing signals during the regularly recurring vertical synchronization intervals when undesired equalizing and serrated pulses are present. The circuit means incorporates integrating means for discriminating predetermined regularly recurring timing signals from signals including noise pulses.

6 Claims, 2 Drawing Figures

TIMING SIGNALS FOR VELOCITY ERROR CORRECTION

Figure 1:
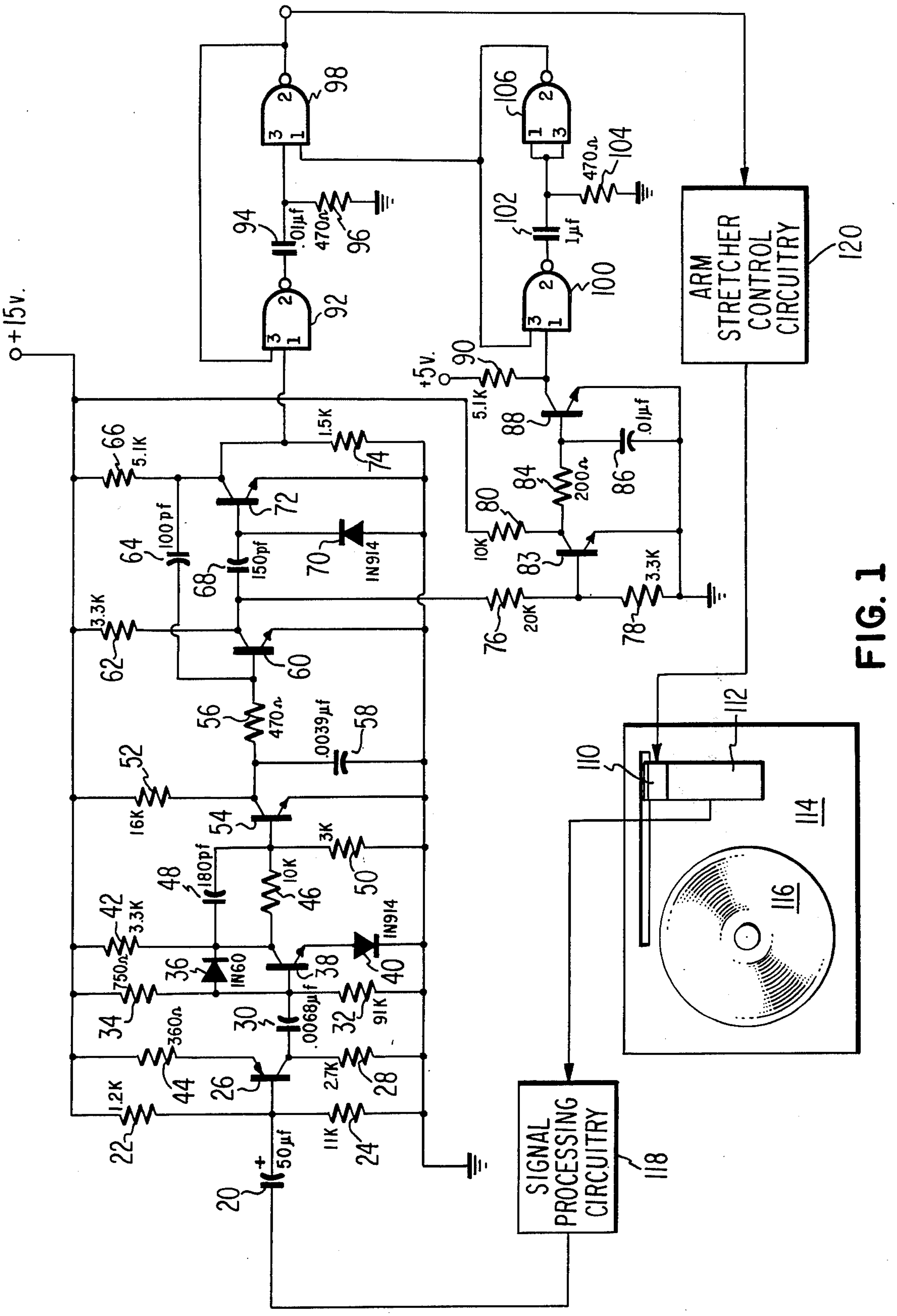

This invention relates to apparatus for providing timing signals for a velocity correcting mechanism and more particularly to apparatus for providing relatively noise-free timing pulses for correcting recurrent and non-recurrent velocity errors in a rotating record medium from which video and timing information are extracted.

Video information can be recorded on a record medium by forming a video-signal-representative topographic pattern along a spiral groove in the medium. Recorded video information may then be extracted from a suitable playback disc (record) replicated from the one upon which the original recording was made. In one such system, the playback disc is coated with a thin layer of metal followed by a thin layer of dielectric material and a capacitance-sensing probe (pick-up stylus) is arranged to ride in the spiral groove of the disc. The pick-up stylus cooperates with the dielectric and metal layers on the playback disc to provide a variable electrical capacitance corresponding to the topographically recorded video signal information. The capacitance variations are then decoded to recover the recorded video signal information. A system that decodes prerecorded video information from a disc by sensing capacitance variations in the spiral groove of the disc is described in a co-pending U.S. Patent Application in the name of Jon K. Clemens, Ser. No. 126,772, now U.S. Pat. No. 3,842,194 which is assigned to the same assignee as the present invention.

In the playback of an information-storing disc (video disc), by, for example, the above-described method, the disc is rotated at a relatively high speed of about 450 revolutions per minute (rpm). The pick-up stylus rides in the spiral groove of the disc and by means of appropriate circuitry signals are extracted and processed into a form suitable for coupling to an image display device such as a color television picture tube. In order to avoid undesirable jitter in the displayed television image, it is necessary to maintain the rotational velocity of the disc with respect to the pick-up stylus relatively constant (e.g., to within 0.01%). Errors in disc rotational velocity occur if, for example, the playback disc is not prefectly centered on the turntable or if the disc center hole is not perfectly centered with respect to the recorded spiral groove. To compensate for velocity errors caused, for example, by eccentricity of the information storing spiral groove of the video disc with respect to the center hole, an arm stretching device, that is, a device which can effectively reposition the signal pick-up stylus along the spiral groove in anticipation of the velocity errors, may be incorporated. Such a device can be formed by coupling an electromagnetic transducer, constructed in the same form as a relatively small loudspeaker, between the pick-up stylus and its associated housing (i.e., the pick-up arm). The pick-up stylus is coupled, for example, to a coil of the arm stretcher which corresponds to the voice coil of a loudspeaker. By application of appropriate electrical signals to this coil, the pick-up stylus can be caused to move along the spiral groove of the recorded disc medium. Such an arm stretcher is described in U.S. Pat. No. 3,711,641, in the name of Richard C. Palmer, assigned to RCA Corporation.

In operating the above-described arm stretcher, it is necessary to provide timing signals, indicative of the stretcher velocity of the rotating playback disc, to the associated arm stretcher control circuitry. Horizontal synchronization pulses recorded on the video disc provide a convenient timing signal for this purpose. However, during the vertical synchronizing interval, equalizing pulses and serrations in the vertical synchronizing pulses provide signals that can be undesirable for the velocity detecting portion of the arm stretcher control circuitry. In order for the arm stretcher control circuitry to accomodate these equalizing and serrated pulses, undesirably elaborate circuitry is necessary. Further, noise pulses that occur among the horizontal synchronizing pulses may undesirably affect the operation of the arm strecther by causing a false actuation of the arm stretcher and consequent erroneous phasing of the signal information from the playback disc. It is therefore desirable to provide horizontal synchronizing pulses (timing signals) that are relatively noise-free and free of equalizing pulses and serrated pulses occurring during the vertical retrace interval.

In accordance with the present invention, apparatus for discriminating prerecorded regularly recurring signals from other signal information recorded on an information storing disc and for processing the regularly recurring signals to be suitable for cooperation with apparatus for detecting changes in rotation of velocity of the disc comprises a means adapted for receiving signals including regularly recurring components from the information storing disc. A separating means is utilized for removing particular regularly recurring components from the signals received from the video disc. An integrating means is coupled to the separating means and provides sawtooth-shaped signals in response to the signals applied to it. An amplitude detecting means provides output signals responsive to the sawtooth-shaped signals that exceed a predetermined amplitude and an output means provides output signals of a predetermined width in response to the signals received from the detecting means. In a preferred embodiment of the invention, blanking means is coupled to the output means and inhibits output from the output means during an interval that corresponds substantially to a vertical synchronizing interval.

Figure 2:
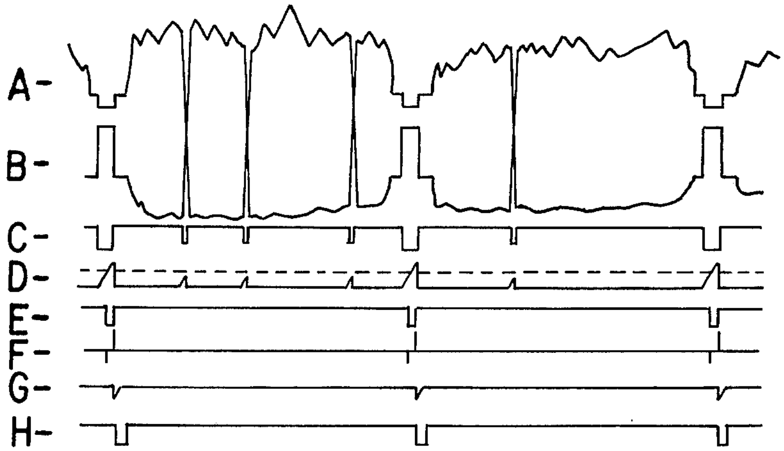

A better understanding of the invention may be derived from the following detailed description in connection with the accompanying drawings of which:

FIG. 1 is a partial schematic and block diagram of a video disc player apparatus embodying the invention; and FIG. 2 illustrates waveforms associated with the apparatus of FIG. 1.

With reference to FIG. 1, a video disc player 114 has a recorded video disc 116 situate thereon. A pick-up arm 112 located on player 114 is arranged for receiving recorded signals from disc 116. Signals received by pick-up arm 112 are coupled to signal processing circuitry 118. Processed signals from circuitry 118 are coupled to the base electrode of a transistor 26 through a capacitor 20. Biasing resistors 22 and 24 provide a substantially fixed voltage bias to the base electrode of transistor 26. A resistor 44 is coupled between a source of supply voltage and the emitter electrode of transistor 26 and provides degenerative feedback to this transistor stage. A resistor 28 is coupled between ground and the collector of transistor 26 providing a load impedance for transistor 26. Signals derived at the collector of transistor 26 are coupled to the base electrode of a transistor 38 by a capacitor 30. Bias voltage is supplied to the base electrode of transistor 38 by resistors 32 and 34 coupled respectively from ground and the source of supply voltage to the associated base electrode. A diode 40 is coupled between ground and the emitter electrode of transistor 38 to effectively increase the reverse breakdown voltage from the base-emitter junction of transistor 38 to ground. Diode 36 is coupled between the base electrode and collector electrode of transistor 38 and operates to inhibit transistor 38 from saturating. A resistor 42 is coupled between the source of supply voltage and collector electrode of transistor 38 and operates as a collector load resistor. A parallel combination of a capacitor 48 and a resistor 46 couples signals from the collector of transistor 38 to the base electrode of a transistor 54. Bias voltage is supplied to transistor 54 by the combination of a resistor 50 coupled between the base electrode and ground and the afore-mentioned resistor 46. Transistor 54 has an emitter electrode coupled to ground and a collector electrode coupled to the source of supply voltage through a load resistor 52. An integrating capacitor 58 is coupled between ground and the collector electrode of transistor 54. Signals derived at the collector electrode of transistor 54 are coupled to the base electrode of a transistor 60 by a resistor 56. Transistor 60 has an emitter electrode coupled to ground and a collector electrode coupled to the source of supply voltage through a resistor 62. Signals derived at the collector electrode of transistor 60 are respectively coupled to the base electrodes of transistors 72 and 83 by a capacitor 68 and a resistor 76. A resistor 78 is coupled between the base electrode of transistor 83 and ground. Transistor 83 has an emitter coupled to ground and a collector coupled to the source of supply voltage through a load resistor 80. A resistor 84 is coupled between the collector electrode of transistor 83 and the base electrode of transistor 88. An integrating capacitor 86 is coupled between the base electrode of transistor 88 and ground. A load resistor 90 is coupled between a 5-volt source of supply voltage and the collector electrode of transistor 88. Signals derived at the collector of transistor 88 are direct coupled to a first terminal of a NAND gate 100. Signals derived at a second terminal of NAND gate 100 are coupled to first and third terminals of a NAND gate 106 by a timing capacitor 102. A timing resistor 104 is coupled between ground and the combined first and third terminals of NAND gate 106. Output signals derived at terminal 2 of NAND gate 106 are coupled to a third terminal on NAND gate 100 and a first terminal on a NAND gate 98.

A clipping diode 70 is coupled between the base electrode of transistor 72 and ground. Transistor 72 has an emitter electrode coupled to ground and a collector electrode coupled respectively to the source of supply voltage through resistor 66 and to ground through a resistor 74. A speed-up capacitor 64 is coupled from the collector electrode of transistor 72 to the base electrode of transistor 60. Signals derived at the collector of transistor 72 are direct coupled to a first terminal of a NAND gate 92. Signals derived at the second terminal of NAND gate 92 are coupled to a third terminal of NAND gate 98 through a timing capacitor 94. A timing resistor 96 is coupled between the third terminal of gate 98 and ground. Signals derived at the second terminal of NAND gate 98 are coupled to a third terminal of NAND gate 92 and to arm stretcher control circuitry 120.

In the operation of the illustrated apparatus of FIG. 1, playback disc 116 is rotated at a substantially constant speed of about 450 rpm upon disc player 114. Pick-up arm 112 is positioned over disc 116 and a pick-up stylus therein (not shown) is caused to ride in the information storing groove of the disc. Capacitance measured at the pick-up stylus varies in accordance with the recorded topography of the playback disc 116. These capacitance variations are decoded and processed in signal processing circuit 118 to form a composite video television signal comprising varying image-representative components and regularly recurring components, particularly vertical and horizontal synchronizing pulses of the form employed in a standard television broadcast signal. A typical composite video signal is illustrated as waveform A in FIG. 2. Capacitor 20 couples the composite video signal from signal processing circuitry 118 to the base electrode of transistor 26. A bias voltage applied to the base electrode of transistor 26 (a PNP device) is arranged such that the more negative portions of the applied input signal are more greatly amplified in transistor 26 than the less negative portions. Hence, a composite video signal, such as waveform A of FIG. 2, when applied to the base electrode of transistor 26 is nonlinearly amplified and inverted to produce an output at the collector of transistor 26 as illustrated in waveform B of FIG. 2. The video signal produced at the collector of transistor 26 is coupled to the base electrode of transistor 38 through capacitor 30. Transistor 38 (an NPN device) has biasing resistors 32 and 34 selected such that biasing current supplied to the base of transistor 38 is just barely sufficient to cause it to conduct. Consequently, the most positive portions of the signals applied to the base electrode of transistor 38 cause transistor 38 to conduct strongly and conversely, the least positive or negative portions cause transistor 38 to cease conduction. Thus, inverted signals derived at the collector of transistor 38 are substantially from only positive portions of the signals applied to the associated base electrode as shown in waveform C of FIG. 2. The positive portions of the input signals applied to the base of transistor 38 correspond generally to the synchronization (sync) signals of the composite video signals produced by processing circuitry 118 and to the spurious noise signals which may be associated with the playback of a video disc. Sync and noise signals provided at the collector of transistor 38, as shown in waveform C of FIG. 2, are coupled to the base electrode of transistor 54. Transistor 54 (an NPN device) is biased such that the positive-most signals applied to the base electrode cause transistor 54 to saturate and thereby maintain capacitor 58 discharged. During the duration of sync and noise pulses, transistor 54 is cut-off and capacitor 58 is allowed to charge through resistor 52 producing a voltage across capacitor 58 corresponding to waveform D of FIG. 2. When the charge on capacitor 58 exceeds a value of about 0.6 volts, transistor 60 turns on (the dotted line illustrated in waveform D of FIG. 2 corresponds to a 0.6 volt level). Transistor 60 provides a relatively high gain to the sawtooth-shaped signals applied to its base and produces a rectangular-shaped pulse during the duration of time that the input voltage to the base exceeds the 0.6 volt level as illustrated in waveform E of FIG. 2. Noise pulses appearing in between the successive sync pulses also allow capacitor 58 to charge. However, these noise pulses generally lack sufficient duration (energy) to allow capacitor 58 to charge to the 0.6 volt level and consequently do not turn transistor 60 on.

The rectangular pulses derived from transistor 60 are coupled to a differentiating circuit comprised of the series combination of capacitor 68 and diode 70 wherein the negative-going portions of the rectangular pulses (leading edges) are differentiated to form negative-going impluses. Similarly, positive-going portions of the rectangular pulses (trailing edges) are differentiated to form positive-going impulses by the differentiating circuit comprised of the series combination capacitor 68 and the base-emitter diode junction of transistor 72. FIG. 2, waveform F illustrates the differentiated pulses appearing at the base electrode of transistor 72. The positive-going impulses corresponding to the trailing edges of the aforementioned rectangular pulses cause conduction in transistor 72 and produce an output at the collector electrode corresponding to waveform G of FIG. 2. Load resistors 66 and 74 coupled to the collector of transistor 72 operate as a voltage divider preventing the maximum voltage level at the collector electrode of transistor 72 from exceeding a 5-volt level. The 5-volt limitation is employed in order to insure proper operation of NAND gate 92 to which the collector of transistor 72 is directly coupled.

When the signal applied to terminal 1 of NAND gate 92 goes from a quiescent level of 5 volts to a level of about zero volts, the output from NAND gate 92 at terminal 2 goes from about zero volts to about 5 volts. This causes the capacitively coupled voltage at terminal 3 of NAND gate 98 to follow rapidly to approximately the same voltage level. If the voltage applied to terminal 1 of NAND gate 98 is at about a 5-volt level coincidentally with the voltage on terminal 3, then the output at terminal 2 of NAND gate 98 will change from about 5 volts to about zero volts and consequently the voltage on terminal 3 of NAND gate 92 will be the same zero volt level. Capacitor 94 is selected in correspondence with resistor 96 to provide a time constant of about 5 microseconds. Hence, when terminal 3 of NAND gate 98 is caused to change to about 5 volts by the change in voltage at terminal 2 of NAND gate 92, that 5 volt level will decrease towards zero through resistor 96 and cause the output at terminal 2 of NAND gate 98 to change from zero volts to about 5 volts after about 5 microseconds. The 5 microsecond pulses produced at terminal 2 of NAND gate 98 have leading edges corresponding in time to the trailing edges of horizontal sync pulses initiating them.

Signals provided at the collector of transistor 60 are further coupled through resistor 76 to the base electrode of transistor 83. Transistor 83 operates in a similar manner to transistor 54. That is, in the absence of signal information to the base electrode, transistor 83 is biased into saturation maintaining the voltage across capacitor 86 at substantially zero volts. Upon the application of signal information (sync) to the base electrode, transistor 83 is cut-off allowing capacitor 86 to charge towards the supply voltage through resistors 80 and 84. The relatively narrow pulses corresponding to the horizontal sync pulses provide an insufficient time interval to allow capacitor 86 to charge to a level sufficient to cause conduction in transistor 88. The broader vertical sync signals (not shown), however, do supply a sufficient time interval for capacitor 86 to charge and cause conduction in transistor 88. When conduction occurs in transistor 88, the voltage at the collector electrode changes from about 5 volts to about zero volts causing this same voltage change to occur at terminal 1 of NAND gate 100. A zero volt level at either terminals 1 or 3 of NAND gate 100 causes the output voltage at terminal 2 of NAND gate 100 to change from about zero volts to about 5 volts. Since the quiescent voltage on terminals 1 and 3 of NAND gate 106 is zero volts, the voltage on terminal 2 of this NAND gate and consequently the voltage on terminal 3 of NAND gate 100 is at a level of about 5 volts. Hence, when the voltage on terminal 1 of NAND gate 100 changes from about 5 to about zero volts, the output voltage on terminal 2 of this NAND gate changes from zero to about 5 volts. This change in voltage at the output (terminal 2) of NAND gate 100 is imposed upon terminals 1 and 3 of gate 106 by capacitor 102 and causes the voltage on terminal 2 of NAND gate 106 to change from about 5 volts to about zero volts. The voltage on terminal 2 of NAND gate 106 remains at this zero volt level for about 500 microseconds as determined by the time constant of resistor 104 and capacitor 102. Thereafter, the voltage at terminal 2 (NAND gate 106) returns to the quiescent level of about 5 volts.

During the period of time when the output at terminal 2 of NAND gate 106 is at substantially zero volts, terminal 1 of NAND gate 98 is held at that zero volts level. This inhibits the output of NAND gate 98 from changing from a 5 to a zero volt level during that interval of time preventing output pulses from occurring at terminal 2 of NAND gate 98. Hence, pulses derived at terminal 2 of NAND gate 98 correspond only to the horizontal sync pulses occurring during the interval when vertical sync is absent. During the vertical sync interval, the output at the aforementioned terminal 2 is effectively blanked and no output signals occur. Equalizing and serrated pulses occurring during the vertical sync interval are thereby eliminated from the output signal. Timing signals derived from the above described circuitry utilize the trailing edges of the horizontal sync pulses to trigger the output pulse forming network (NAND gates 92, 98). The equalizing and serrated pulses have widths that are different from that of the horizontal sync pulses and further have trailing edges occurring out-of-phase with the trailing edges of the horizontal sync pulses. Since the timing pulses are derived from the trailing edges of the applied pulses, inclusion of the equalizing and serrated pulses in the developed timing signal would cause phase errors to occur. It is therefore desirable to blank the output (terminal 2 of NAND gate 98) during the vertical sync interval to eliminate the equalizing and serrated pulses.

The timing pulses derived at the output of NAND gate 98 are coupled to arm stretcher control circuitry 120 wherein changes in the relative time between successive timing pulses are detected and form an error signal which is then coupled to the arm stretcher 110. During the vertical sync interval when timing pulse information is not available, sample and hold circuitry incorporated within the arm stretcher control circuitry maintains the error signal from the preceeding horizontal timing signal preventing thereby an erroneous signal corresponding to the vertical sync interval.

Hence, timing signals substantially free of noise pulses and extraneous pulses occurring during the vertical sync interval (equalizing and serrated pulses) may be derived and utilized for operating a velocity correcting arm stretcher.

What is claimed is:

1. In a playback system for an information storing disc of the type providing storage of prerecorded composite signals comprising regularly recurring synchronization components, including horizontal synchronization pulses and serrated vertical synchronization pulses, and associated picture-representative video signal; said playback system including pickup means for recovering the stored composite signals under playback conditions involving the provision of relative motion between said pickup means and said disc; said playback system being undesirably subject to spurious variations of the velocity of relative motion between said pickup means and said disc during playback; velocity error correction apparatus comprising:

means for adjusting the position of said pickup means to alter the velocity of relative motion between said pickup means and said disc during playback of an information storing disc;

means for controlling the energization of said pickup means position adjusting means;

means for supplying timing information, derived from recurring synchronization components of the composite signals recovered by said pickup means, to said controlling means to effect operation of said position adjusting means in a sense opposing said spurious variations of said relative velocity; and means, selectively responsive to the vertical synchronization pulses of the composite signals recovered by said pickup means, for disabling said timing information supplying means during the occurrence of each of said vertical synchronization pulses.

2. In a playback system for an information storing disc of the type providing storage of prerecorded composite signals comprising regularly recurring synchronization components, including horizontal synchronization pulses and serrated vertical synchronization pulses, and associated picture-representative video signals; said playback system including pickup means for recovering the stored composite signals under playback conditions involving the provision of relative motion between said pickup means and said disc; said playback system being undesirably subject to spurious variations of the velocity of relative motion between said pickup means and said disc during playback; velocity error correction apparatus comprising:

means responsive to composite signals recovered by said pickup means for separating said recurring synchronization pulses from the associated picture-representative video signals;

means responsive to the output of said separating means for generating timing pulses with leading edges substantially coincident with the trailing edges of the pulses separated by said separating means;

means coupled to the output of said separating means and selectively responsive to said vertical synchronization pulses for disabling said timing pulse generating means during the appearances of said vertical synchronization pulses in the output of said separating means; and means responsive to the output of said timing pulse generating means for opposing said spurious variations of the velocity of relative motion between said pickup means and said disc.

3. Apparatus in accordance with claim 2 wherein said timing pulse generating means includes integrating means coupled to said separating means for providing sawtooth-shaped signals having an amplitude responsive to the width of signals applied thereto;

detecting means coupled to said integrating means for providing signals in response to said sawtooth-shaped signals exceeding a predetermined amplitude; and means for developing constant width output pulses in response to signals provided from said detecting means.

4. Apparatus according to claim 3 wherein:

said output pulse developing means includes differentiating means for providing an edge-representative pulse output coincident with the trailing edge of signals applied thereto from said detecting means; and means responsive to said edge-representative pulse output for providing a rectangular signal of predetermined width.

5. Apparatus according to claim 4 wherein said edge-representative pulse output responsive means includes:

a first timing network;

a first NAND gate coupled to said differentiating means and said timing network; and a second NAND gate coupled to said timing network and to said first NAND gate for providing rectangular output signals of a predetermined width at the output of said second NAND gate in response to pulses provided by said differentiating means.

6. Apparatus according to claim 3 wherein said disabling means includes:

a capacitor;

means for charging said capacitor;

means having an input for receiving signals from said detecting means and an output coupled across said capacitor for maintaining said capacitor discharged in the absence of signals received from said detecting means and for permitting the charging of said capacitor by said charging means during the reception of signals from said detecting means;

a transistor having an input electrode coupled to said capacitor and an output electrode for providing signals in response to a voltage across said capacitor exceeding a predetermined level;

means responsive to signals from said transistor for providing rectangular blanking signals having width substantially equal to a vertical synchronization interval; and means coupling said blanking signals to said timing pulse generating means for inhibiting output therefrom during the interval of said blanking signals.

* * * * *